April 9, 1935.  H. A. DOUGLAS  1,997,209
CONTROL MECHANISM
Filed Nov. 2, 1933

INVENTOR
HARRY A. DOUGLAS
BY Langdon Moore
ATTY.

Patented Apr. 9, 1935

1,997,209

UNITED STATES PATENT OFFICE 1,997,209

CONTROL MECHANISM

Harry A. Douglas, Bronson, Mich.

Application November 2, 1933, Serial No. 696,444

6 Claims. (Cl. 171—97)

This invention relates to control mechanism and more particularly to the combination of electric circuits and switches for selectively controlling the operation of lighting systems adaptable most advantageously to automotive vehicle lighting equipment.

The customary automotive vehicle lighting systems include a tail-light and headlights, the latter usually including two filament bulbs, one to project a straight forward beam of great intensity, commonly referred to as the "bright" light and the other to tilt the beam upon the road in front of the vehicle, commonly referred to as the "tilt" or "dim" light. It is also customary in many cases to provide lights including bulbs of less intensity to be operated when the automotive vehicle is standing still. Such lights are usually referred to as "parking" lights and are either displayed at each side of the vehicle or the bulbs are contained within the headlights. Also, it is usual practice to mount the headlights to direct the beam or ray therefrom parallel to the longitudinal axis of the automotive vehicle, so that the ray travels in the direction of movement of the vehicle.

Heretofore such automotive vehicle lighting systems have been controlled by a single switch for selectively operating the various lights. It is an object of this invention to interpose an additional switch, preferably one actuated by a slight movement of the foot, to control the operation of one of the headlights from "bright" to "tilt" independently of the other after the customary lighting switch has been selectively operated to establish the "bright" circuits. In such cases when the rays are projected in the direction of travel and another automotive vehicle approaches traveling in the opposite direction, it is desirable to tilt the left headlight, so as not to impair the vision of the other driver and yet fully illuminate the right side of the road.

It is a further object of this invention to mount the headlights at an angle to each other and to the direction of travel, so that the projected rays cross each other or to construct the lenses to bend the rays to give a similar effect and in this case it is desirable to tilt the right headlight allowing the left headlight to remain bright and as the ray projected therefrom is directed to the right, it will fully illuminate the right side of the road without impairing the vision of an approaching driver.

With these and other objects in view reference is made to the accompanying sheet of drawings illustrating preferred embodiments of this invention with the understanding that minor detail changes may be made without departing from the scope thereof.

In the drawing—

Figure 1:
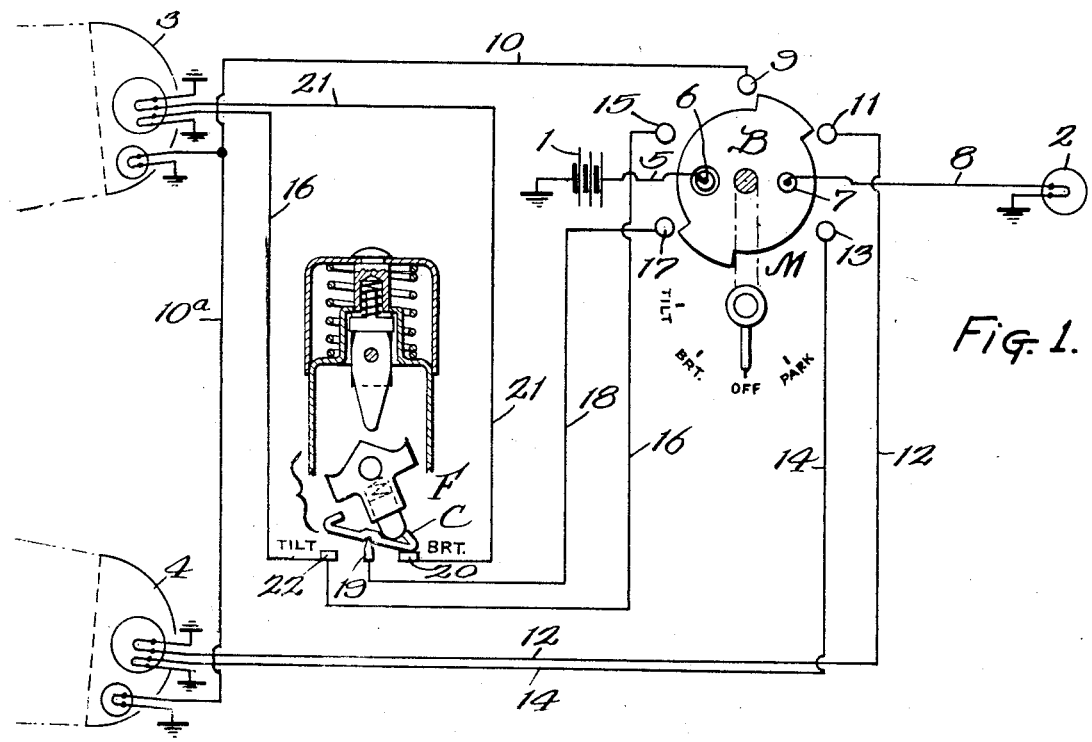
Figure 1 is a schematic wiring diagram of an embodiment of this invention applied to an automotive vehicle lighting system in which the rays from the headlights cross each other and the additional switch is connected to tilt the right lamp, while the left lamp remains bright.

Figure 1 is illustrative of one form of this invention which includes in the automotive vehicle lighting system a battery 1 grounded to the vehicle frame, a rear or tail-light 2 and headlights 3 and 4. In the form shown, the headlights are each provided with a two filament lamp and in addition the headlights are each provided with an additional lamp of less power, offset from the focal center of the reflector to throw the rays upon the road adjacent the vehicle, to provide parking lights, all of which are well-known commercial structures and are therefore illustrated in diagram only.

In the form shown in Figure 1, the headlights are mounted at an angle to each other and to the direction of travel, so that the reflectors thereof are set at a converging angle to direct the projecting beams or rays of light to cross each other or the lenses of the customary direct forward ray headlight are constructed to bend the projected rays to accomplish the same result.

The battery 1 is connected by a conductor 5 to a contact 6 of any desired form of rotary or push and pull four-position manually operated switching device, diagrammatically shown and indicated as M, although it is preferable to employ the type of switching mechanism disclosed in this applicant's application executed on even date herewith, Serial No. 696,445 filed November 2, 1933 and shown in said diagram. A contact 7 of the manually operated switching mechanism M is connected by a conductor 8 to the grounded filament of the lamp of the rear or tail light 2; a contact 9 is connected by conductor 10 and its branch 10a to the grounded filaments of the lamps of the parking lights; a contact 11 is connected by a conductor 12 to the grounded "bright" filament of the lamp in the left headlight 4; a contact 13 is connected by a conductor 14 to the grounded "tilt" filament of the lamp in the left headlight 4; a contact 15 is connected by a conductor 16 to the grounded "tilt" filament of the lamp of the righthand headlight 3; and a contact 17 is connected by a conductor 18 to the contact 19 of an additional electric switching mechanism to selectively control in conjunction with the manual switching device M the operation of the "bright" filament of the lamp in the righthand headlight 3.

It is preferable, but not necessary to the operation of this invention, that this additional switching mechanism be of the foot operated type and preferably a foot switch such as disclosed in this applicant's application executed on even date herewith, Serial No. 707,131 filed January 18, 1934, shown in diagram and indicated as F. In any event, the additional switching mechanism F includes an electric connector C normally in engagement at all times with the contact 19 and operable to be brought into and out of engagement with a contact 20 connected by the conductor 21 to the grounded "bright" filament of the lamp in the righthand headlight 3, and alternately brought into and out of engagement with a contact 22, here shown included in the circuit with the conductor 16 leading from the grounded "tilt" filament of the same lamp.

The manual switch is provided with an electric circuit continuing bridge, diagrammatically shown and indicated as B, which in the position shown opens the circuit from the battery and when operated to move to the right establishes a circuit from the battery 1 to the grounded filament of the lamp in the tail-light 2 by bridging contacts 6 and 7 and at the same time bridging contacts 6 and 9 to establish a circuit from the battery 1 to the grounded filaments of the lamps of the parking lights; when moved to the first position to the left establishes a circuit from the battery 1 to the grounded "bright" filament of the lamp in the lefthand headlight 4 by bridging contacts 6 and 11 and at the same time bridging contacts 6 and 17 to establish a circuit from the battery 1 to the contact 19 of the additional switch F; and when moved to the next position to the left establishes a circuit from the battery 1 to the grounded "tilt" filaments of both lamps in headlights 3 and 4 by bridging contact 6 at the same time with contacts 13 and 15.

By this construction it is seen that when the manual switch M is operated to assume the first position to the left to bridge contacts 11 and 17 a circuit is established from the battery through contact 11 and conductor 12 to the grounded "bright" filament of the lamp in the left headlight 4 and through contact 17 and conductor 18 to contact 19 of the foot switch F and if the foot switch F is in position to bridge contacts 19 and 20, a circuit is continued through contact 20 and conductor 21 to the grounded "bright" filament of the lamp in the right headlight 3, and when the manual switch M is operated to assume the next position to the left to bridge the "tilt" contacts 13 and 15, a circuit is established from the battery through contacts 13 and 15, conductors 14 and 16 to the grounded "tilt" filaments of the lamp in headlights 3 and 4, respectively.

With the manual switch M and the foot switch F in the positions to complete the circuits through the grounded "bright" filaments of the lamps in the headlights, as above described, the headlights are directly controllable by the manual switch to be switched in unison from "bright" to "tilt" and vice versa. When the lamps in both headlights are "bright" and it is desired to reduce the intensity of the ray in the direction of the eyes of a driver approaching from the front, the foot switch F is operated to discontinue the circuit through contacts 19 and 20 and bridge contacts 19 and 22 to establish a circuit from the contact 19 through contact 22, conductor 16 to the grounded "tilt" filament of the lamp in the right headlight 3 and upon again operating the foot switch F, the bright filament of the right headlight 3 will be again placed in circuit and the circuit through the tilt filament discontinued, so that when both headlights are bright, the ring headlights 3 may be dimmed and returned to "bright" at will independently of the left headlight 4 by actuating the foot operated switch F.

As above described and as illustrated in Figure 1, when the switch M is in the position shown the circuit to the battery is open and the operation of the switch F is of no effect.

When the switch M is moved to "park" position a circuit is established from the battery to the "tail" light and another circuit is established to the "parking" light independently of the switch F and the operation of the switch F is of no effect.

When the switch M is moved to the "tilt" position a circuit is established to the "tail" light, a second circuit is established from the battery to the "tilt" filament of the left headlight, and a third circuit is established from the battery to the "tilt" filament of the right headlight. These three circuits are independent of the switch F although the conductor of the circuit to the right headlight is connected to one contact of the switch F, however, the operation of switch F is of no effect. The contact 20 of the switch F is connected to the "bright" filament of the right headlight and, as above said, the contact 22 of the switch F is connected to the "tilt" filament of the left headlight which filament is not in circuit with the battery when switch M is in the "bright" position.

When the switch M is moved to "bright" position a circuit is established from the battery to the "tail" light and another circuit is established from the battery to the "bright" filament of the left headlight independently of the switch F. A third circuit is established from the battery to the contact 19 of the switch F. The connector C of the switch F is connected to the battery in this position of switch M, so that the operation of switch F establishes a circuit from the battery to the "bright" filament of the right headlight or establishes a circuit from the battery to the "tilt" filament of the right headlight depending upon the position of the connector C. As the operation of the switch F opens and closes the respective circuits therethrough alternately the operation of the switch F changes the right headlight from "bright" to "tilt" and from "tilt" to "bright" as the operator may desire, independently of the left headlight. The switch F is operative to control a circuit only when the switch M is in the "bright" position.

Figure 2:
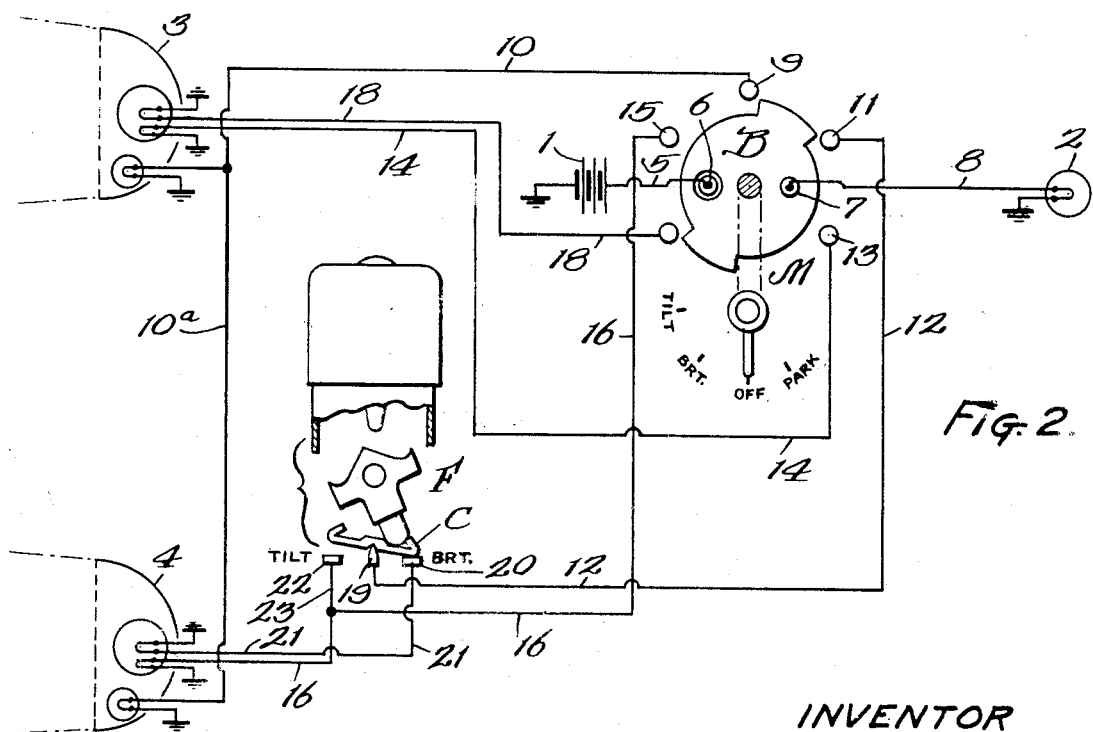
Figure 2 is a similar view illustrating the application of this invention to headlights with the rays projecting in the direction of travel including an additional switch for tilting the ray of the left lamp, while the right lamp remains bright.

In the event the headlights project approximately parallel rays in the direction of travel, it may be desired to change the left headlight from "bright" to "tilt", leaving the right headlight "bright" to illuminate the right edge of the road and yet not impair the vision of the driver of a vehicle approaching from the opposite direction. This may be accomplished, as shown in Figure 2, by the employment of the same manually operated switch M and foot actuated switch F illustrated in Figure 1 by changing the connections of the conductors as follows: Connect conductor 12 from contact 11 to the contact 19 of the foot switch F and the conductor 21 from contact 20 to the "bright" filament of the lamp in the headlight 4; connect conductor 18 from contact 17 to the "bright" filament of the lamp in the right headlight 3; connect conductor 14 from contact 13 to the "tilt" filament of the lamp in the right headlight 3; and connect conductor 16 from contact 15 to the "tilt" filament of the lamp in the left headlight 4. The contact 22 of the foot switch F may be connected in circuit with the conductor 16, as shown in Figure 1, or, if desired, may be connected by a conductor 23 from said contact 22 to the conductor 16, as shown in Figure 2. With such connections between the battery, manually operated switch M, foot actuated switch F and headlights, when both headlights are "bright", the left one may be dimmed and returned to "bright" by continued action of the foot switch independently of the right headlight and both may be dimmed in unison by the operation of the manual switch M.

As above described and illustrated in Figure 2, one contact of the switch F is connected to the conductor leading from switch M to the "tilt" filament of the left headlight and therefore is inoperative to control a circuit except when the switch M is in "bright" position and then controls the establishment of circuits from the battery to the respective filaments of the left headlight.

What I claim is:

1. In a lighting system for an automotive vehicle including a source of electricity, a pair of headlights each provided with two filament lamps, and a switching mechanism for selectively establishing circuits from the source to either the bright or tilt filaments of the headlights in unison, in combination with an additional switching mechanism providing means for selectively controlling the circuits to the said bright and tilt filaments in one of the headlights when the circuit to the bright filament thereof has been established by said first mentioned switch.

2. In a lighting system for an automotive vehicle including a source of electricity, a pair of headlights each provided with two filament lamps, and a switching mechanism for selectively establishing circuits from the source to either the bright or tilt filaments of the headlights in unison, in combination with an additional switching mechanism providing means when the first switch has established a circuit to the bright filaments of both headlights to selectively discontinue the circuit to the bright filament of one of the headlights and establish a circuit to the tilt filament of said headlight independently of the circuit established to the other headlight.

3. In a lighting system for an automotive vehicle, the combination of a source of electricity, a pair of headlights mounted to project their respective light rays to cross each other, each headlight provided with two filament lamps, a switching mechanism for selectively establishing circuits from the source to either the bright or tilt filaments of both headlights, and an additional switching mechanism providing means when the first switch has established a circuit to the bright filaments of both headlights to selectively discontinue the circuit to the right headlight and establish a circuit to the tilt filament of said headlight independently of the circuit established to the left headlight.

4. In a lighting system for an automotive vehicle including a source of electricity, and a pair of headlights each provided with two filament lamps, and a manually operated switching mechanism for selectively establishing circuits from the source to either the bright or tilt filaments of both headlights in unison, in combination with a foot operated switching mechanism providing means when the manual switch has established a circuit to the bright filaments of both headlights to selectively discontinue the circuit to one of the headlights and establish a circuit to the tilt filament of said headlight independently of the circuit established by the manual switching mechanism.

5. In a lighting system for an automotive vehicle, the combination of a source of electricity, and a pair of headlights mounted to project their respective light rays to cross each other, each headlight provided with two filament lamps, a manually operated switching mechanism for selectively establishing circuits from the source to either the bright or tilt filaments of both headlights, and a foot operated switching mechanism providing means when the manual switch has established a circuit to the bright filaments of both headlights to selectively discontinue the circuit to the bright filament of the right headlight and establish a circuit to the tilt filament of said right headlight independently of the circuit established to the left headlight.

6. In a lighting system for an automotive vehicle, including a source of electricity, two headlights each having two filament lamps, a manual switch adapted to be connected to the said source, separate conductors leading from each tilt filament of each lamp to the said switch adapted to be connected therethrough to the said source, separate conductors leading from each bright filament to said switch adapted to be connected therethrough to the said source, and an additional manual switch interposed in the circuit between one bright filament and the first switch having an oscillating current continuing member connected in said circuit adapted to open and close said circuit to said bright filament and having a contact connected to the conductor leading from the tilt filament of said lamp adapted to be engaged by said current continuing member when it opens the circuit to said bright filament whereby when the bright filaments of both headlights are energized, the operation of the additional switch will energize alternately the bright and tilt filaments in one lamp of one headlight.

HARRY A. DOUGLAS.